United States Patent
Cheesman et al.

(10) Patent No.: US 6,282,194 B1
(45) Date of Patent: Aug. 28, 2001

(54) TRANSIT TRUNK SUBNETWORK SYSTEM

(75) Inventors: Julian Francis Cheesman, Kanata; Michael C. Kahnert, Ottawa; Cristian Constantinof, Kanata, all of (CA); Kim Brian Holmes, Rowlett, TX (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/158,855

(22) Filed: Sep. 23, 1998

(51) Int. Cl.⁷ .................................................. H04L 12/56
(52) U.S. Cl. ........................... 370/356; 370/352; 370/467
(58) Field of Search ..................................... 370/465, 395, 370/466, 467, 352, 355, 354, 356, 396

(56) References Cited

U.S. PATENT DOCUMENTS

| | | | | |
|---|---|---|---|---|
| 5,204,857 | * | 4/1993 | Obana | 370/354 |
| 5,359,600 | * | 10/1994 | Ueda et al. | 370/399 |
| 5,483,527 | | 1/1996 | Doshi et al. | 370/352 |
| 5,568,475 | | 10/1996 | Doshi et al. | 370/352 |
| 5,867,571 | * | 2/1999 | Borchering | 379/230 |
| 6,009,100 | * | 12/1999 | Gausmann | 370/397 |
| 6,097,722 | * | 8/2000 | Graham et al. | 370/395 |
| 6,125,117 | * | 9/2000 | Martin et al. | 370/397 |

* cited by examiner

*Primary Examiner*—Douglas Olms
*Assistant Examiner*—Ken Vanderpuye
(74) *Attorney, Agent, or Firm*—Alston & Bird LLP

(57) ABSTRACT

The present invention is related to a transit trunk subnetwork system which is configured to expand the existing capacity for bearer traffic in telephone networks. The invention incorporates an asynchronous transfer mode subnetwork which is interfaced directly with existing local exchange end offices, access tandems, or combinations thereof. A signal controller is utilized to direct signal messaging across the asynchronous transfer mode subnetwork to set up the movement of bearer traffic across the subnetwork. A network manager is also utilized to control bandwidth availability at the interfaces with the asynchronous transfer mode subnetwork.

31 Claims, 7 Drawing Sheets

2 Interconnected Transit Trunk Subnetwork

TRANSIT TRUNK SUBNETWORK SYSTEM

FIELD OF THE INVENTION

This invention relates to the field of telecommunications networks, and in particular, a transit trunk subnetwork which is established between existing narrowband switches to expand bearer traffic capacity.

BACKGROUND OF THE INVENTION

There are a number of significant challenges facing public carriers in telecommunications markets, including a rapidly growing demand for Internet data access over the public switched telephone network (PSTN). The demand for Internet access has been so great that there has been a considerable increase in call holding times on calls to Internet service providers and delays in making connections to the PSTN. In addition, even when connections are made to the Internet, the bandwidth demand imposed by the increasing number of users has strained conventional narrowband network systems and has deteriorated existing service on the PSTN, particularly in North America.

Deregulation and growth in the use of wireless systems, particularly cellular telephones and portable data communications devices, has also strained existing network systems and has created a demand for trunking growth. As more users connect into analog and digital cellular systems, telecommunications carriers will have to expand existing network switching systems and increase trunking capacity between switching systems.

A problem with existing networks is that the interexchange trunks in those networks serve as traffic capacity choke points in the system. That is, the trunks limit the amount of traffic that can be passed between access tandems in the PSTN. In order to handle a large call volume, or the increased call volume due to the sudden growth of the usage of the network for data services, the trunks need to be provisioned with a capacity to handle high call volumes. If the trunk capacity of the access tandems is exceeded, then access tandems also have to be added to the network. Not only is the provisioning of access tandems and interexchange trunking very expensive, such facilities are generally not adapted to support other services during off-peak hours.

The above-mentioned problems typically cause switch port capacity exhaustion in the tandem layer of a voice network. This problem has been addressed by deploying solutions to redirect the traffic to a data network at an access interface or an end office. One such solution is proposed in U.S. Pat. No. 5,483,527 to Doshi et al., issued Jan. 9, 1996. One of the principles behind this patent is to accumulate voice signals from synchronous transfer mode switches (STMs) and form asynchronous transfer mode (ATM) cells from the signals. After a pre-determined number of signals are received, the cell is transferred over an ATM switching system, and the data is converted back to synchronous transfer mode voice signals.

A drawback of the Doshi et al. system is that it essentially imposes a synchronous transfer mode architecture on the ATM network. Telephone calls are transferred through the ATM network using permanent virtual circuits and each of the asynchronous transfer mode switches in the network is provided with a signal processor and call processor that receive common channel signaling messages and transfer those messages on to a next switch in the ATM call path or the destination switch in the telephone network, as appropriate. Since every single ATM switch requires those signal and call processors, this configuration is expensive to implement. It also leads to an inefficient usage of available bandwidth on the network. Therefore, a need exists in the telecommunications markets for a system which can improve bearer traffic capacity using ATM facilities, while permitting efficient usage of available bandwidth on the ATM network. A need also exists for a system which can increase bearer traffic capacity using an ATM network control system that readily integrates with various types of TDM switches that exist in the PSTN network. An additional need exists for a subnetwork which can absorb additional growth in call volumes so as to prevent the need for provisioning trunks with a capacity to handle high call volumes. A further need exists for a subnetwork which eliminates the requirement to provision high capacity trunking connection in existing synchronous transfer mode (STM) networks.

SUMMARY OF THE INVENTION

It is an object of the present invention to provide a system that permits narrowband traffic to be directed through asynchronous transfer mode (ATM) networks.

It is another object of the present invention to provide a transit trunk subnetwork which establishes a virtual network of signaling trunks between existing narrowband switches using ATM facilities to efficiently expand the traffic capacity of existing narrowband switches.

It is another object of the present invention to provide a transit trunk subnetwork which can be linked together with other transit trunk subnetworks to provide interconnected virtual networks of trunks between existing narrowband switches to multiply the traffic capacity of existing narrowband switches.

It is a further object of the present invention to provide a transit trunk subnetwork which interconnects end offices of telecommunications carriers such that the transit trunk subnetwork functions as a virtual access tandem interconnecting end office.

According to a first broad aspect, the invention provides a transit trunk subnetwork for interconnecting a first synchronous transfer mode (STM) access switching system to a plurality of other synchronous transfer mode switching systems. The transit trunk subnetwork includes an asynchronous transfer mode (ATM) network connected by a first communications trunk to a first STM switching system and by second communications trunks to other STM switching systems. The transit trunk subnetwork also includes interfaces respectively connecting the first and second trunks with the ATM network, and converts STM data to ATM cells and ATM cells back to STM data. The transit trunk subnetwork further includes a signal controller for interpreting common channel signaling messages and for mapping the movement of the signaling messages between the first and second STM switching systems, as well as a management system for managing bandwidth demand at the interfaces. The signal controller and management system are independent of the STM switching systems and the ATM switching systems, though they are nodes in the ATM network and have ATM addresses.

According to a second broad aspect, the invention provides a transit trunk subnetwork for enhancing the bearer traffic capacity of an existing network. The transit trunk subnetwork includes an ATM network, interfaces connected between exchange carriers and the ATM network, and between access tandem switching systems and the ATM network. The transit trunk subnetwork further includes a signal controller and management system, where the signal controller and management system are independent of the exchange carriers and the access tandem switching systems.

In accordance with a third broad aspect, the invention provides a networked system which includes two or more transit trunk subnetworks, the networked system being utilized for interconnecting a first STM switching system to a plurality of other STM switching systems. Each of the transit trunk subnetworks include an ATM network connected by a first communications trunk to a first STM switching system and by second communications trunks to other STM switching systems. The network system also includes interfaces connecting the first and second communications trunks with the STM switching systems, as well as a signal controller for interpreting signaling messages and for mapping the movement of signaling messages between the first and second trunks. A management system manages bandwidth demand at the interfaces with the ATM network. Each of the subnetworks are interconnected via ATM switches within the ATM network.

In accordance with a fourth broad aspect, the invention provides a virtual tandem switch comprising a transit trunk subnetwork for interconnecting end offices of local exchange carriers. The virtual tandem switch includes a signal controller for interpreting common channel signaling messages and for controlling the movement of those messages between the end offices. A management system manages bandwidth demand at interfaces to each of said end offices.

According to a fifth broad aspect, the invention provides a method for expanding the communications capacity of a pre-existing STM network. The pre-existing STM network including STM switching systems interconnected by trunk connections. The method comprises the steps of:

1) overlaying said STM switching systems with a subnetwork of ATM switches;
2) interconnecting the STM switching systems with the subnetwork of ATM switches using interfaces between the subnetwork and the STM switching systems, the interfaces being adapted to convert STM bearer traffic directed to the subnetwork from a synchronous transfer mode format to an asynchronous transfer mode format;
3) connecting a signal control system to the subnetwork, the signal control system being adapted to interpret signaling messages and map the movement of the signaling messages between the STM switching systems and the subnetwork of ATM switches;
4) connecting a management system to the subnetwork of ATM switches to manage bandwidth requirements of the ATM switches, the signal control system and management system being implemented on platforms independent of the STM switching systems.

According to a sixth broad aspect, the invention provides a transit trunk subnetwork system for enhancing bearer traffic capacity of an existing STM network using an ATM network. The system includes interfaces for interconnecting exchange carriers with the ATM network, and interfaces connected to one or more access tandems. The system further includes a signal controller for interpreting signaling messages and for mapping the movement of those signaling messages between the exchange carriers and the access tandem, and a management system for managing bandwidth demand within the ATM network. The signal controller controls the network which carries a particular STM call based on the network services required for call completion.

The invention therefore provides a versatile transit trunk subnetwork which can be implemented in a variety of configurations to relieve congestion in the PSTN.

Ideally, the transit trunk subnetwork can also be used to support other data services so that the cost of provisioning is spread over a broader user base. Furthermore, the transit trunk subnetwork interfaces and control systems support transparent integration with STM networks so that no modifications to the STM switches are required aside from routing changes to routine tables.

DETAILED DESCRIPTION OF THE PREFERRED EMBODIMENT

This invention provides a transit trunk subnetwork which permits narrowband traffic to be directed through asynchronous transfer mode networks.

Figure 1:
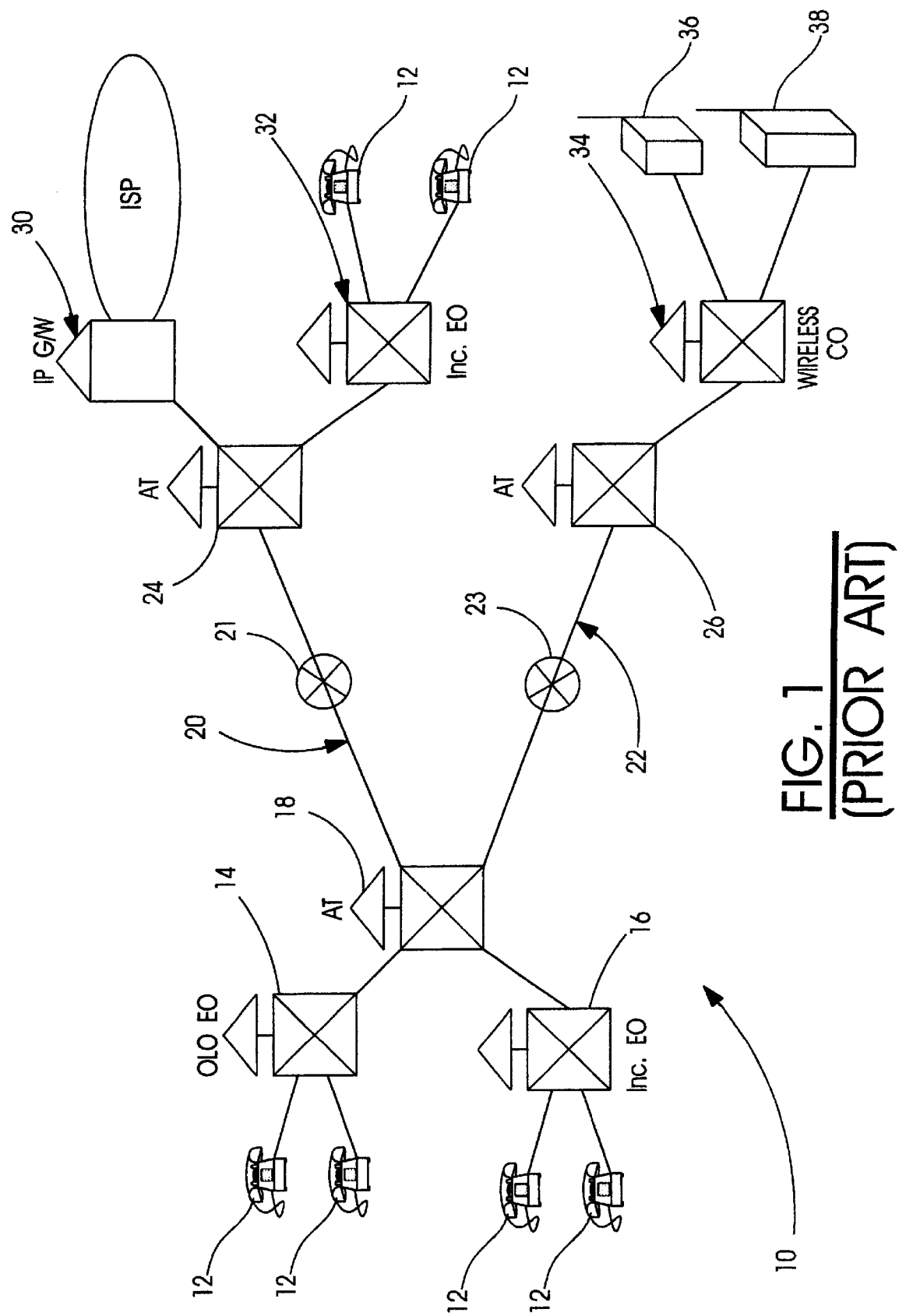
FIG. 1 shows a conventional STM network of end offices which are interconnected by a network of access tandems.

FIG. 1 illustrates an example of a prior art telecommunications trunking system which interconnects the end offices of various telecommunications carriers. An incumbent local exchange carrier (ILEC) end office 16 as well as competitive local exchange carriers (CLEC) end offices 14 are illustrated as part of this network. Telephone lines 12 which extend into private premises, such as homes, offices or businesses are respectively connected to the end offices 14 and 16. The end offices 14 and 16 are each connected to an access tandem 18 by trunks 19. The end offices 14 and 16 as well as the access tandem 18 are switching systems adapted to carry bearer traffic consisting of voice and voice grade data. The bearer traffic originates from the telephone lines 12 and is switched by the end offices 14 and 16 which forward inter-exchange bearer traffic to the access tandem 18. The access tandem 18 is generally capable of serving a larger number of exchange carrier end offices than what is shown in FIG. 1. The capacity of the access tandem 18 to serve exchange carrier end offices is dependent upon the specific design of the access tandem. The access tandem may also serve an Internet protocol (IP) gateway. For example, the access tandem 24 is connected to the IP gateway 30 which is in turn connected to an Internet service provider (ISP) network to provide Internet access to various users within the STM network.

The access tandem 18 forwards bearer traffic into the PSTN 20 where it may traverse other tandem switching points (SSPs) (not illustrated). The bearer traffic is transferred on trunks 20 or 22, through the PSTN and on to the access tandems 24 or 26, for example. The access tandems 24 and 26 can then forward the bearer traffic on to an appropriate one of the exchange carriers, such as incumbent local exchange carrier end office 32, and a wireless communications company office 34. The incumbent local exchange carrier end office 32 is a switching system which is adapted to pass interexchange bearer traffic on to individual telephone lines 12. The wireless communications company office 34 switches interexchange bearer traffic to wireless mobile telephones, such as those shown at 36 and 38. The wireless communications company office 34 also switches bearer traffic from the mobile telephones 36 and 38 to other points in the PSTN.

Figure 2:
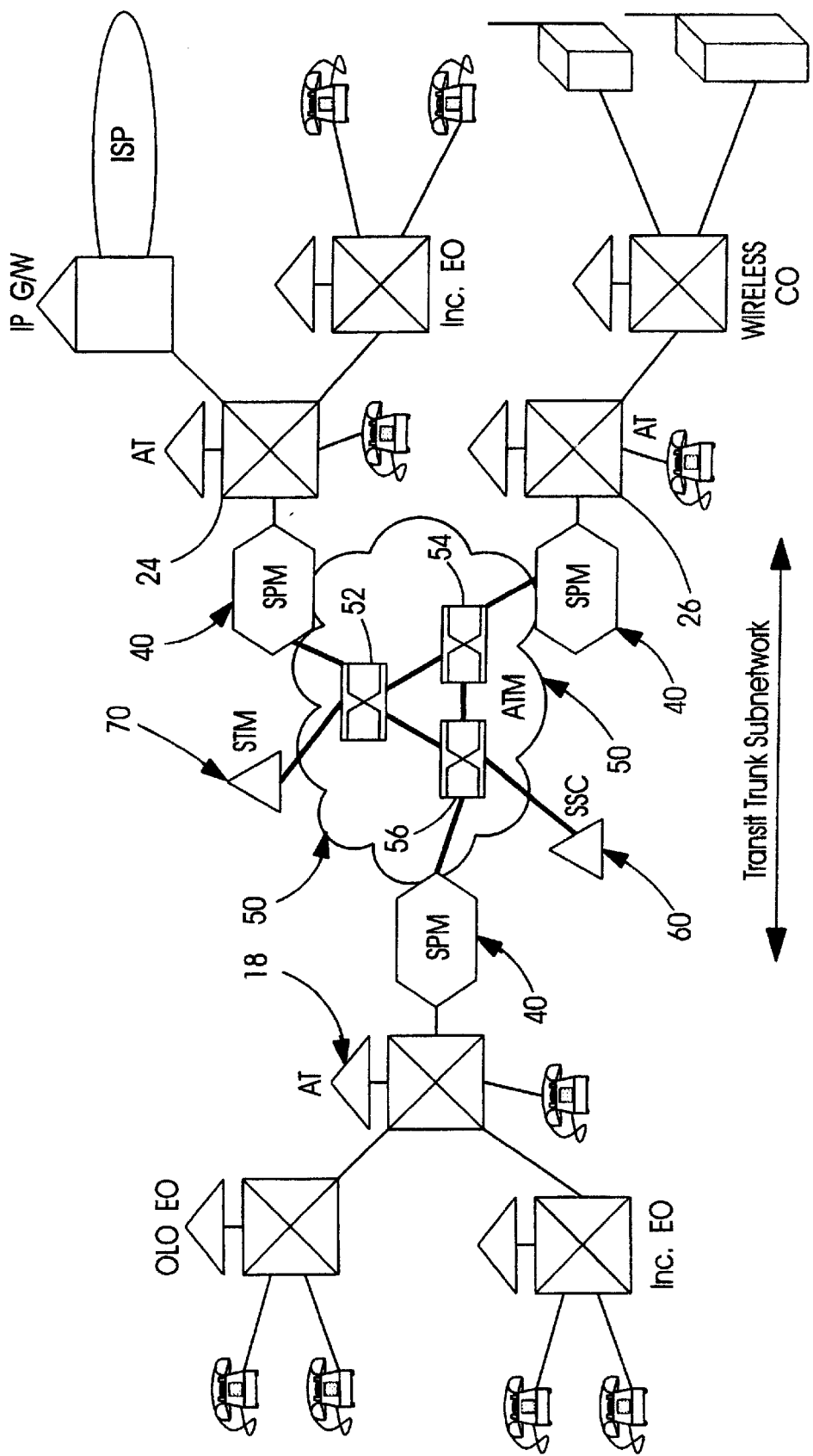
FIG. 2 is a schematic diagram of a preferred embodiment of the transit trunk subnetwork of the present invention.

FIG. 2 illustrates a transit trunk subnetwork which alleviates the choke point problem that occurs in the interexchange networks of the PSTN due to switch port capacity exhaustion in the tandem layer. The transit trunk subnetwork 50 includes an asynchronous transfer mode (ATM) backbone which is composed of a series of interconnected ATM switches 52, 54 and 56. The ATM backbone network 50 is configured to interconnect between the access tandems 18, 24 and 26 as illustrated in FIG. 2. However, since the bearer traffic from the access tandem 18 is in STM protocol, and the bearer traffic being forwarded to the access tandems 24 and 26 must also be in STM protocol, a series of interfaces 40 are arranged between the backbone ATM network and the access tandems. The interfaces are hereafter referred to as Spectrum Interworking Units (SPMs). The SPMs 40 interface with the access tandems 18, 24 and 26, and convert bearer traffic from STM protocol to asynchronous transfer mode cells, and vice versa.

The SPMs 40 may be configured as either free-standing units or peripherals to existing access tandems. For the configuration shown in FIG. 2, the access tandems switch incoming bearer traffic from end offices and direct intertandem traffic to the SPMs 40. The SPMs 40 convert the traffic to STM cells and transfer the cells to the ATM network 50. The ATM network 50 in turn transfers the cells to another SPM 40 which converts the cells back to STM protocol and transfers the traffic to the appropriate access tandems. Bearer traffic in the ATM network is transferred on switched virtual circuits (SVCs) established between SPMs 40.

In order for the transit trunk subnetwork to function properly, a signal controller for receiving and interpreting common channel signaling messages associated with STM calls is required. This function is performed by a subnetwork signal controller (SSC) shown at 60 in FIG. 2. The SSC 60 interprets ISUP portions of common channel signaling messages and relays those messages between the access tandems 18, 24 and 26. The SSC 60 may also be enabled to determine whether an incoming call should be sent over the STM trunks 20, 22 or transferred through the ATM network 50. ISUP (ISDN User Part) is a Signaling System 7 protocol used for establishing and tearing down voice and voice grade data calls in the PSTN. Signaling System 7 is the common channel signaling system currently used in most of the North American PSTN.

The SSC 60 also performs other critical control functions for the operation of the transit trunk subnetwork. In particular, the SSC 60: 1) identifies the ATM addresses of SPMs 40 associated with originating and terminating access tandems; 2) establishes switched virtual circuit connections between the SPMs 40 as required; and 3) controls the mapping between the communications trunks and the switched virtual circuit connections in the SPMs 40. Thus, the SSC 60 establishes the necessary mapping and connections to ensure that such calls are properly routed through the network to other SPMs 40 which convert ATM cells back into synchronous transfer mode so that the bearer traffic may be switched to the appropriate access tandem associated with the appropriate end office.

The transit trunk subnetwork further includes a subnetwork trunk manager (STM) 70 which maintains information regarding the SPMs 40 in the subnetwork, and their association with the individual switches interfaced with the SPMS. The STM 70 also manages the bandwidth requirements at the ATM interfaces within the transit trunk subnetwork. This permits the ATM backbone portion of the transit trunk subnetwork 50 to be adjusted to accommodate fluctuations in the amount of bearer traffic being carried through the subnetwork.

The STM 70 can be responsible for up to five basic functions within the transit trunk subnetwork. These functions can be delegated to management subsystems within particular components such as the SPMs or SSCs, or may be entirely delegated to the subnetwork trunk manager. These functions include:

(1) Transit System Configuration

This function involves establishing the message signaling links between the various components of the subnetwork. These message signaling links are established as permanent virtual circuits (PVCs) within the subnetwork, as opposed to the bearer traffic which is transferred over switched virtual circuits (SVCs).

(2) Fault Management

This function includes alarm surveillance, monitoring of system performance thresholds, diagnostic testing, fault localization and fault correction.

(3) Performance Management

This function involves the gathering of statistical data from components within the transit trunk subnetwork to monitor, control, or modify the operation of these components. This may include, but is not limited to measuring traffic loads being handled by the system; assessing the behaviour of the system relative to certain loads; insertion of faults into the system to determine how quickly the system recovers, etc.

(4) Billing

Call accounting may be performed by either the STM 70 or by the synchronous transfer mode switching systems at the edge of the transit trunk subnetwork.

(5) Security

This function involves control of access to the transit trunk subnetwork.

Figure 3:
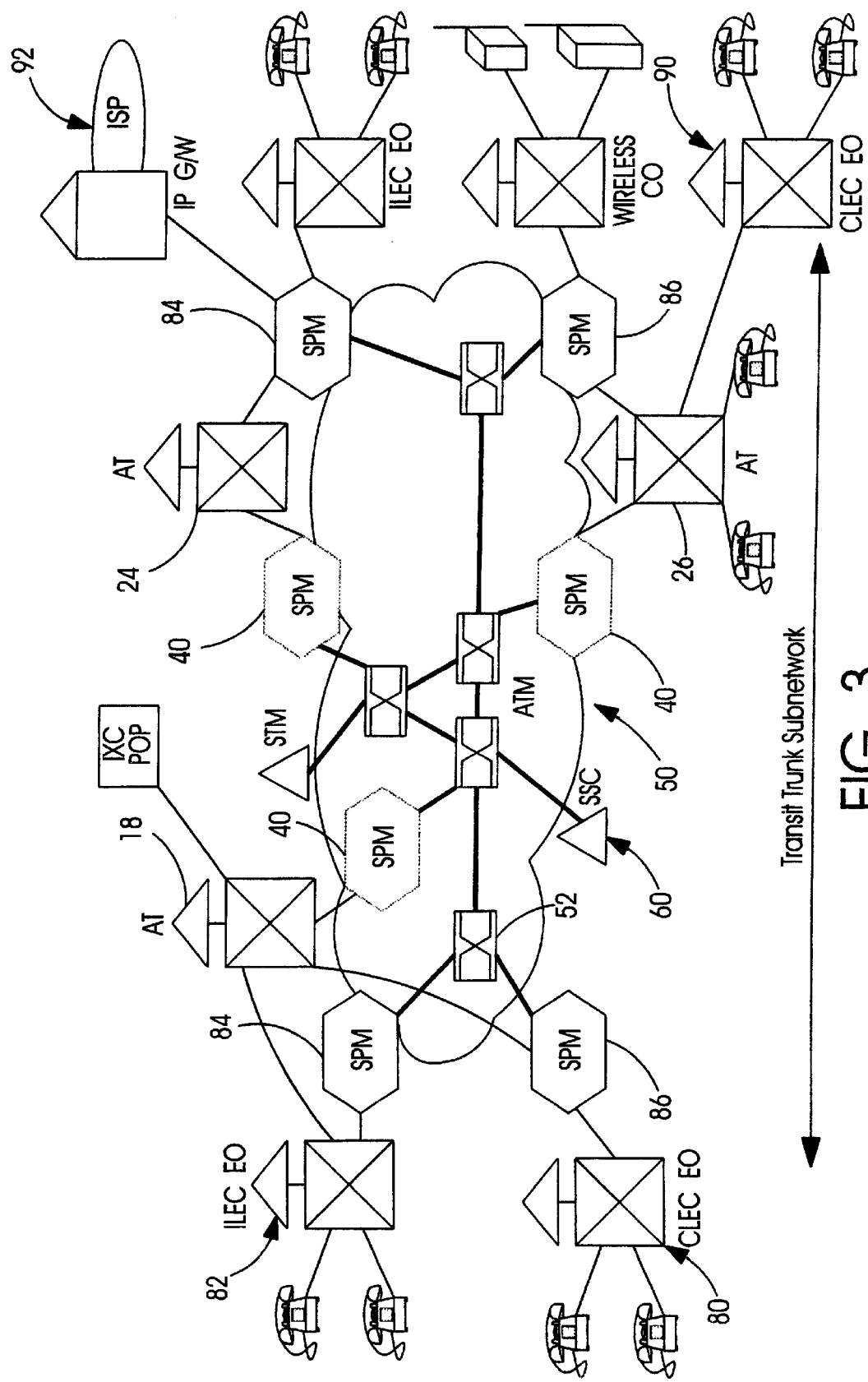
FIG. 3 illustrates a transit trunk subnetwork which is directly interconnected with end offices so that bearer traffic can either be routed directly between end offices or to access tandems in the STM network, depending on network services required.

FIG. 3 illustrates a second embodiment of the invention where the transit trunk subnetwork is configured in what is referred to as a "bypass configuration". In this configuration SPMs 84 and 86 provide an interface between the end offices 80 and 82, and the access tandems 18, 24 and 26. The SPMs 84 and 86 may be configured in one of three ways: 1) as trunking peripherals to the end offices 80, 82 and 90; 2) as trunking peripherals to the access tandem; and 3) as freestanding independent units. Each configuration has certain distinct advantages. For example, if it is desirable to have early traffic consolidation and processing load sharing, it is preferable to arrange the SPMs 84 and 86 as peripherals to the end offices 82 and 80. Deployment of the SPMs as stand-alone units provides processing relief for the access tandems.

When the SPMs are deployed as end office trunking peripherals, it is the end office's task to direct the bearer traffic to the SPM or to an access tandem 18, 24 or 26. When the SPMs are deployed in the stand alone configuration, the traffic splitting may be under the control of the SSC 60 or the access tandem 18. ISUP signaling messages can be sent by the end offices to either the SSC 60 or access tandem 18 and the respective entity can choose a route based on required call processing features. An ISUP Initial Address Message (IAM) can be analyzed to determine whether the incoming call is either: 1) non-featured; 2) source-featured; 3) end featured. A non-featured call is a plain old telephone service (POTS) call such as a direct dialed local or long distance telephone call. A source-featured call is a telephone call which requires a routing translation indicated by a prefix such as "1-800 " "1-888" or the like, in which case a database query is required to obtain routing information. An end-featured call is a call to a called number that requires special treatment such as direct inward dialing (DID) termination, or the like.

The SSC may be enabled to direct calls through the ATM network 50 based on required call processing features. For example, an SSQ 60 can be configured to direct non-featured and end-featured calls to the ATM network, while directing source featured calls to the PSTN which is equipped to handle database queries to obtain routing information. In another example, if an incoming call is a POTS call, the signaling message for the call may be routed from the ILEC end office 82 through the SPM 84 and into the ATM network at switch 52. The SSC 60 receives the signaling messages and sets up a switched virtual circuit (SVC) for transferring cells related to the call. The call may bypass access tandems altogether. As another example, a long distance call may be routed from an end office 80 to an end office 91 without being switched by an access tandem. This route is called a bypass route which permits a more direct connection between the end offices. The SSC 60 may also discriminate the calls using other criteria, and the SSC of the present invention is not limited to any specific type of call filtering.

When the SSC interprets an ISUP/IAM message which indicates that an incoming call should be directed through the transit trunk subnetwork, the SSC 60 establishes switched virtual circuit connections between the relevant SPMs 40 in order to provide path for the transfer of the bearer traffic through the ATM. When the call is released, the switched virtual circuit may either be taken down or cached, depending upon management policy. A detailed description of the call setup and release procedures are included in the discussion of FIGS. 6–7 which follow.

The configuration shown in FIG. 3 is an expanded version of the transit trunk subnetwork shown in FIG. 2 in which additional SPM interfaces permit calls to be routed through the ATM network or passed to the PSTN. This provides a greater capacity for handling bearer traffic, since at least a part of the traffic can be routed directly between end offices and congestion of the access tandems is relieved. In the embodiment shown in FIG. 2, all traffic routed to the ATM network 50 had to be routed through an access tandem 18, 24 or 26. Thus, the capacity of each access tandem still imposed a choke on traffic volume. In the configuration shown in FIG. 3, traffic can be routed directly between end offices and the only chokes imposed on traffic volume are imposed by the capacity of the SPMs 84, 86, etc. Thus, the embodiment of FIG. 3 has a greater capacity for handling bearer traffic and permits improved control over the routing of this traffic in and around the subnetwork. This configuration also allows for improved bandwidth efficiency and leads to port savings on the access tandems. By carrying and switching bearer traffic between the SPMs, the ATM network acts as an extension of the access tandem switching network. Furthermore, by diverting a part of the exchange carrier traffic from the access tandems to the transit trunk subnetwork, this configuration reduces the management effort of provisioning a trunking network to accommodate the exchange carrier traffic churn.

Figure 4:
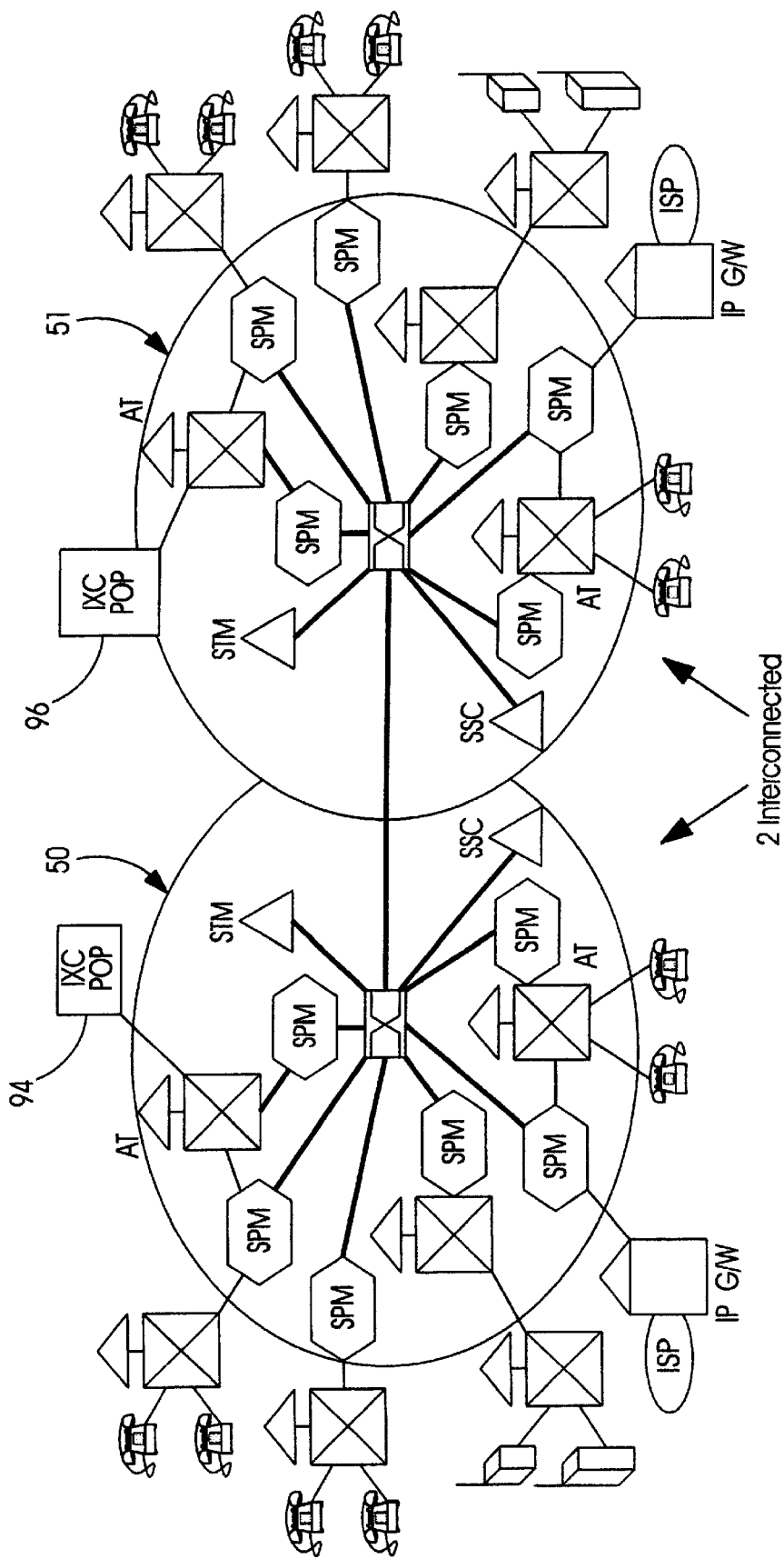
FIG. 4 illustrates two interconnected transit trunk subnetworks.

FIG. 4 illustrates a broader application of the transit trunk subnetwork. In this application, two transit trunk subnetworks 50 and 51 are interconnected. Although FIG. 4 shows only one ATM switch in each subnetwork, the subnetworks may each include a plurality of ATM switches. The advantage of this configuration is that it permits a subnetwork to connect with the resources of another subnetwork when the capacity of the signaling controller within a given subnetwork is exhausted. This connectivity permits each subnetwork to considerably expand its reach for handling bearer traffic without having to substantially redesign or reconfigure the subnetwork.

Figure 5:
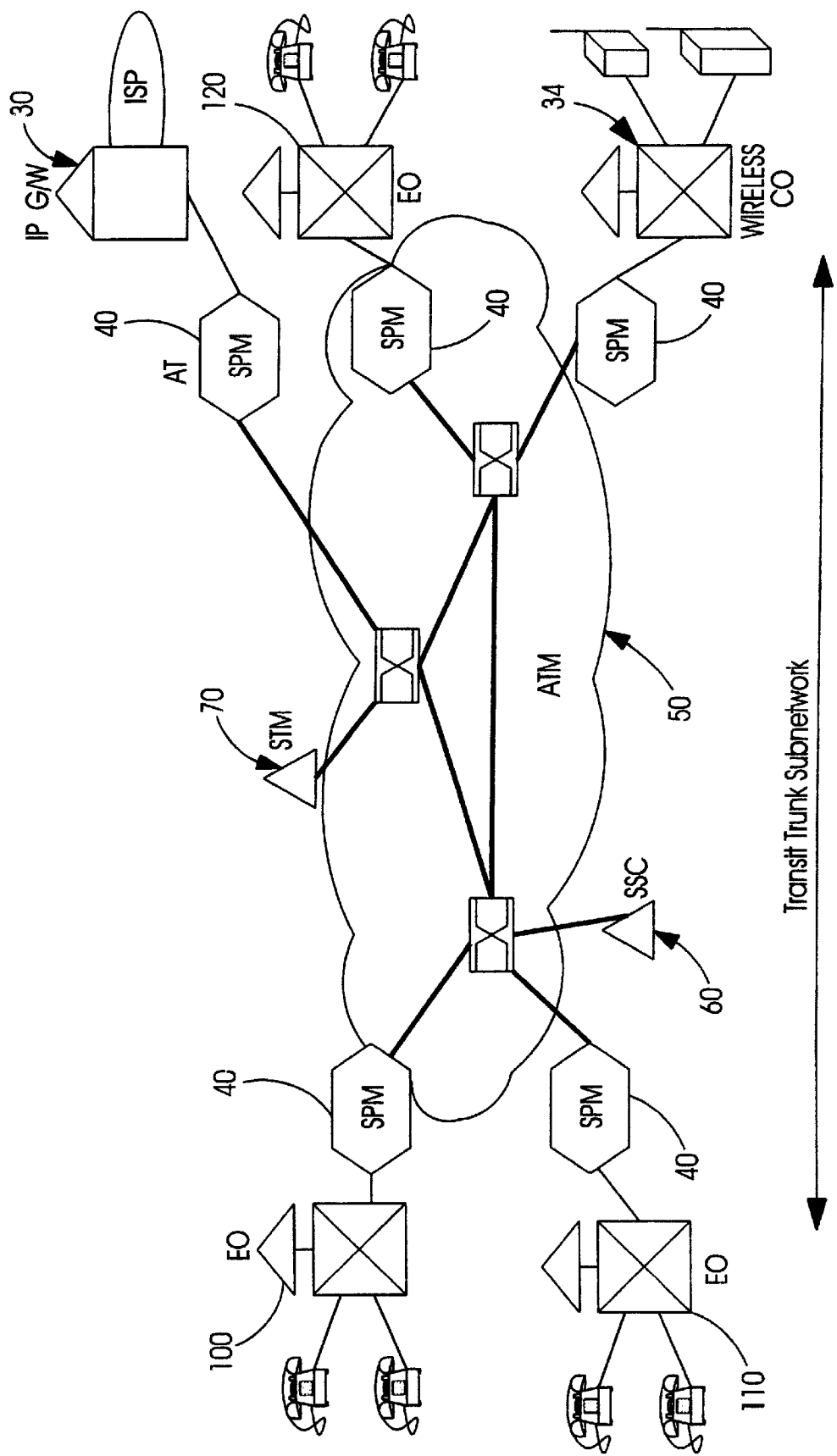
FIG. 5 illustrates a transit trunk subnetwork which serves the function of an access tandem.

FIG. 5 illustrates a further embodiment of the invention where the transit trunk subnetwork is configured to perform all the functions of an access tandem. Local exchange end offices 100 and 110 are located outside of the transit trunk subnetwork, along with an IP gateway 30, wireless company office 34, and a third exchange carrier end office 120. Each one of these communications carriers are linked to SPMs 40. The transit trunk subnetwork further includes an SSC 60 and an STM 70. This transit trunk subnetwork configuration appears to all of the end office switches as a standard access tandem, but in reality is a distributed set of elements which can be located in multiple sites. The advantage of this configuration is that it functions as an access tandem, but has a far higher capacity for routing and managing traffic than a conventional access tandem. In the existing PSTN architecture, calls from an end office are routed across trunks to an access tandem and routed from the access tandem to an inter-exchange carrier or to another end office. The trunks between the end offices and the access tandem have a finite capacity which cannot be expanded unless more trunks and related trunk termination equipment are added at the end offices and the access tandem. In the virtual access tandem configuration, calls are routed over SVCs to a terminating end office. This permits network resource sharing in a way that is not possible in the PSTN or in prior art ATM implementations in which permanent virtual circuits (PVCs) are used for call completion. Consequently, the virtual access tandem can use the flexible routing that is an inherent capability in an ATM network to realize much more call handling capacity than can be realized with prior art STM or ATM implementations. This "virtual access tandem" permits an ATM network to behave as a single, large capacity access tandem that can draw on the bandwidth resources of multiple ATM switching systems. The operation of this subnetwork is essentially the same as that described above in reference to FIG. 2, except that the SPMs 40 interface directly with the end offices, rather than interfacing with an access tandem. Thus, access tandems are not required.

In the embodiment of FIG. 5, SSC 60 is configured to interpret both ISUP (ISDN User Part) and TCAP (Transactions Capabilities Applications Part) signaling messages. As described above, the ISUP signaling messages are used to control the set up and release of trunk circuits that carry voice and data between a calling party and a called party. However, TCAP messaging permits non-circuit related information exchange between signaling points. TCAP messaging can be used to determine routing numbers associated with 800, 888 or 900 numbers, to query databases, for PCS routing and other functions known and understood by the person of ordinary skill in the art. In the preferred embodiment of FIG. 5, the SSC 60 is configured to interpret both ISUP and TCAP messages, as well the signaling controller in other embodiments may also be configured in this manner.

The SSC 60 in FIG. 5 is illustrated as being connected only to the trunk transit subnetwork. However, the SSC 60 may also be connected to a common channel signaling network to enable it to send TCAP query messages to a service control point (not illustrated). As will also be understood by those skilled in the art, the transit trunk subnetwork 52 may be connected to an inter-exchange carrier (not shown) or to another transit trunk subnetwork as shown in FIG. 4. The SSC 60 can communicate with the inter-exchange carrier using SS7 signaling messages so that bearer traffic can be directed from the virtual tandem to an inter-exchange carrier if a call requires routing through the PSTN for termination.

An important feature of the present invention is "network transparency". This means that the STM switches which communicate with the ATM subnetwork do not require an awareness of the presence of the ATM subnetwork, and thus do not need to be redesigned or significantly reprovisioned to integrate with the ATM subnetwork. For example, in the ATM subnetwork shown in FIG. 2, the SSC 60 can control the ATM subnetwork using information extracted from SS7 signaling messages. Consequently, the access tandems 18, 24 and 26 can direct calls as if it were directing calls to any other PSTN switch. Thus, the ATM subnetwork provides a new connection layer solution that augments the existing narrowband connection architecture without affecting the call layer.

Figure 6:
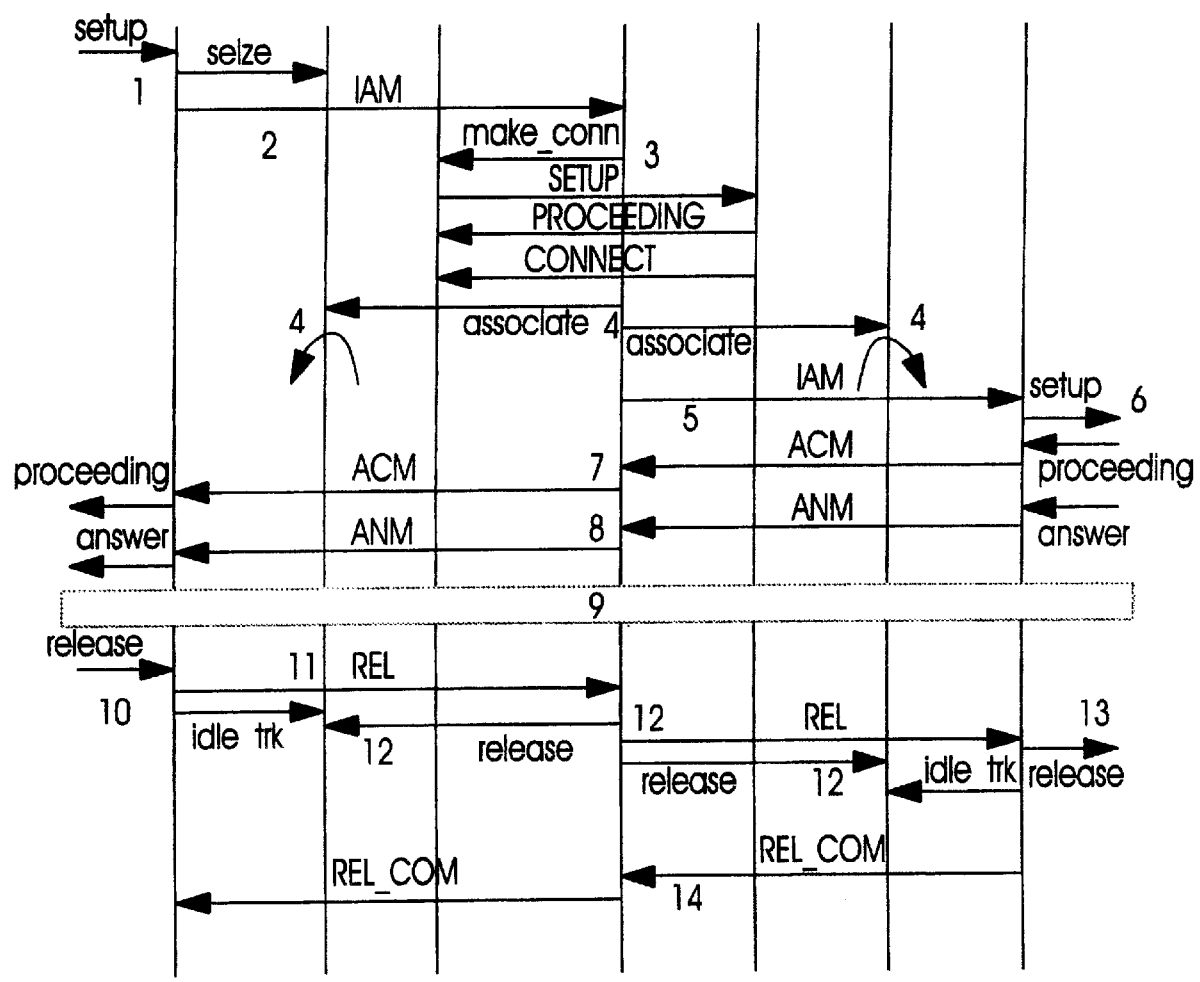
FIG. 6 illustrates a first call walk through sequence for a transit trunk subnetwork system in accordance with the present invention.

FIG. 6 is a schematic diagram of a call walk through for a POTS telephone call which is routed through the transit trunk subnetwork. The network architecture illustrated in FIG. 6 is based on the transit trunk subnetwork shown in FIG. 2 and includes an originating switch (PC=1), which is for example an access tandem 18. The terminating switch (PC=2) is, for example, access tandem 24. The triangle (PC=9) represents both the SSC 60 and STM 70. The cloud symbol under the triangle represents the transit trunk subnetwork described above.

The call proceeds in accordance with the following steps:
Step 1
Incoming call set-up signals are received at the originating switch. The originating switch translates the incoming signals and the routing function of the originating switch selects a terminating trunk group derived from routing tables using the dialed digits. The routeset for the selected trunk group identifies the transit trunk subnetwork as the destination for this portion of the call. A trunk member is then seized (for example, the trunk member with a circuit identification code (CIC), CIC=3000).

Step 2
An ISUP initial address message (IAM) is built by the originating switch and transmitted on a signaling link for the appropriate routeset. The IAM includes the following information: (originating point code) OPC=1; (destination point code) DPC=9; CIC=3000; the called number; and the calling number.

Step 3
The SSC 60 receives the IAM, which initiates the following sequence of events:
 a) translation tables are parsed to determine the terminating SPM within the trunk transfer subnetwork;
 b) an available CIC is selected on the routeset between the signaling server and the terminating switch (for example, CIC=4000);
 c) a check is made to see if an ATM virtual circuit already exists between the originating and terminating SPMs;
 d) the virtual circuit channel identifier (VCCI) is set to a unique value which can be derived by using an algorithm based on the two CICs involved in the call;
 e) using either delegate signaling or Q.2931 proxy signaling, an SVC is set up between the two end point addresses, unless an SVC already exists. In the present example, an SVC does not exist and one is set up.

Step 4
A message is then sent to the SPMs that serve the originating and terminating switches, instructing them to associate the trunk with the SVC set up for this call. This transaction must be acknowledged by both of the SPMs before proceeding. The originating SPM will record the following association: (OPC=1, DPC=9, CIC=3000) to virtual path identifier (VPI), virtual circuit identifier (VCI), which in combination identify the SVC. The terminating SPM will make the following association: (OPC=9, DPC=2, CIC=4000) to (VPI, VCI). This association is also retained by the signaling server for the duration of the call.

Step 5
The IAM received at the SC is modified as follows:
 a) the OPC changed from (1—originating switch) to (9—SSC);
 b) the DPC changed from (9—SSC) to (2—terminating switch);
 c) the CIC changed from 3000 to 4000;
 d) all other parameters are left unchanged. The IAM is then packed in ATM cells sent on to the terminating switch via the SPM associated with the terminating switch.

Step 6
The IAM is received at the SPM associated with the terminating switch. The SPM converts the IAM from ATM cells to SS7 ISUP format and forwards the IAM to the terminating switch. At the terminating switch ongoing translations and routing are performed.

Step 7
When the call is ready to proceed, an address complete message (ACM) is built (OPC=2, DPC=9, CIC=4000) and sent using the appropriate routeset back to the SPM which packs the message content in ATM cells and transfers the ATM cells to the SSC. The ACM is received by the SSC and is modified as follows:
 a) the OPC is changed from (2—terminating switch) to (9—SSC);
 b) the DPC is changed from (9—SSC) to (1—originating switch);
 c) the CIC is changed from 4000 to 3000. The ACM is then forwarded on to the SPM associated with the originating switch which converts the ATM cells to SS7 ISUP format and forwards the ACM to the originating switch.

Step 8
Upon answer of the call at the terminating switch, an answer message (ANM) is formulated (OPC=2, DPC=9, CIC 4000) and sent to the SSC via the SPM. The SSC modifies the ANM (OPC=9, DPC=1, CIC=3000) and forwards the ANM to the SPM associated with the originating switch. The SPM converts the ATM cells to SS7 format and forwards the ANM to the originating switch.

Step 9
At this point, the call is connected and conversation may take place.

Step 10
A release of the call is made at the originating switch (calling party hangs up). This is shown only for purposes of illustration, as it would be readily understood that the sequence of events which follow would be a mirror image of those described if the call were released by the called party.

Step 11

A release message (REL) is built by the originating switch and passed to the associated SPM which packs the contents of the message into ATM cells and transfers the cells to the SSC.

Step 12

The SSC instructs the originating and terminating SPMs to release the association of the trunk member (CIC) to the SVC for this call. The cross-connection is released and the connection information for the call is discarded. The SSC may be enabled to either cache the SVC or release it. In this example, the SVC is released. The REL is then forwarded to the terminating switch with appropriate changes made to the OPC, DPC and CIC.

Step 13

Normal release procedures are followed at the terminating switch.

Step 14

The release procedure is completed when the terminating switch passes a release complete message (RLC) to the associated SPM which transfers the message to the SSC where the message is modified as described above and transferred via the associated SPM to the originating switch.

Although the signaling messages described above were transferred through the transit trunk subnetwork 50, it will be understood by those skilled in the art that the SSC 60 may be connected directly to the common channel signaling network (not shown) so that signaling messages can be exchanged over the common channel signaling network between the SSC 60 and the originating and terminating switches.

Figure 7:
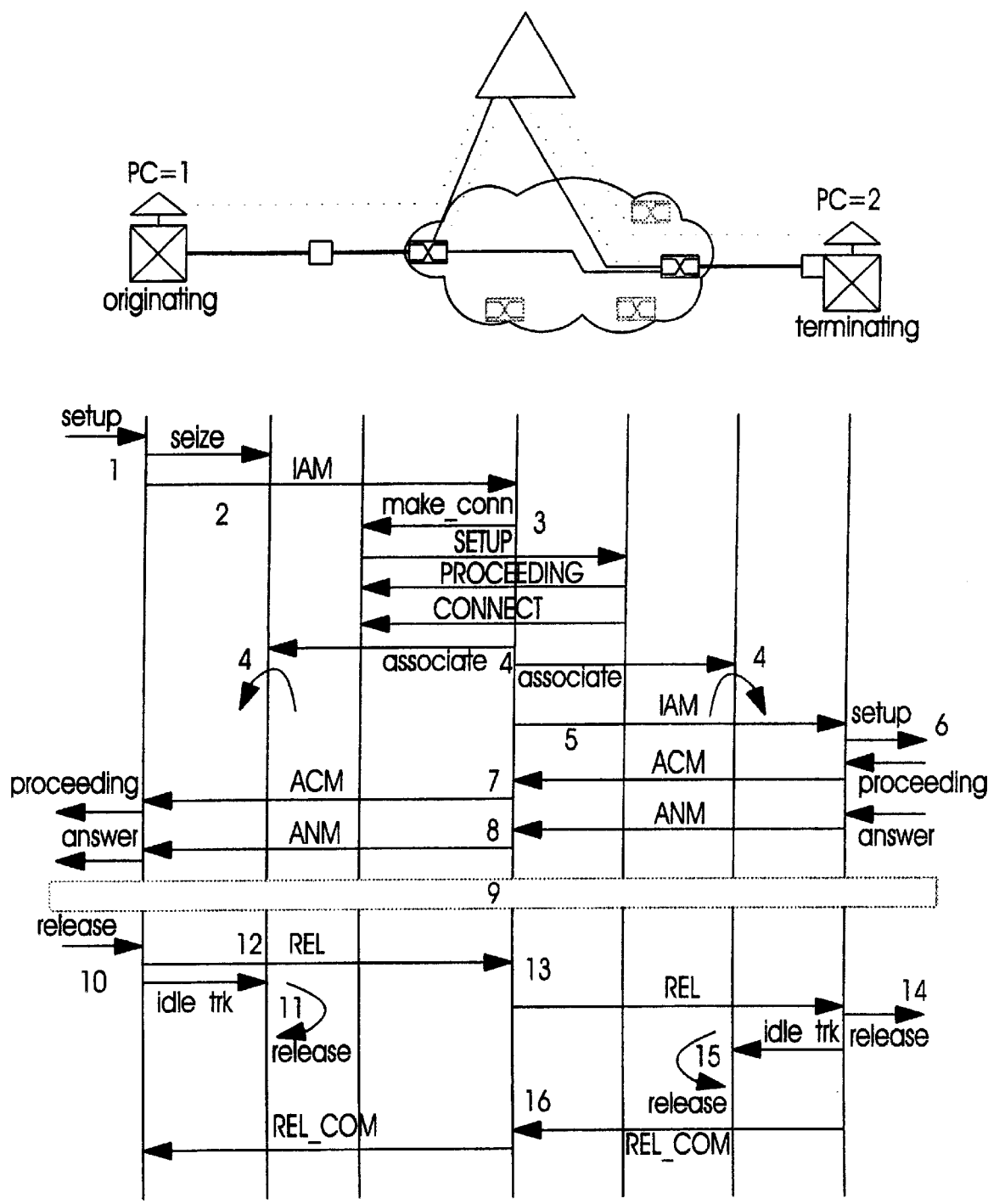
FIG. 7 illustrates a second call walk through sequence for a transit trunk subnetwork system in accordance with the present invention.

FIG. 7 is a schematic diagram of another call walk through model for the basic transit trunk subnetwork system shown in FIG. 2. This call walk through model, like the call walk through model shown in FIG. 6, involves an originating switch (PC=1) and a terminating switch (PC=2). However, in this implementation a transparent routing method is used in which the PSTN switches are not aware of the ATM network and are provisioned to formulate SS7 messages as if direct trunks existed to other switches served by the transit trunk subnetwork. Consequently, the originating switch formulates an IAM with a DPC=2, instead of DPC=9. Thus, the IAM as well as other messages are addressed in such a manner that the transit trunk subnetwork does not appear to exist. As a result, the signaling system and associated ATM network are transparent to the PSTN switches it serves. This has the advantage that the SSC 60 does not have to maintain a call connection memory or associated connection mapping information during the call.

The call walk through for the transparent routing involves the following steps:

Step 1

Incoming call set-up signals are received at the originating node. The following steps are performed in association with the call set-up:
 a) translations are performed using portions of the dialed number;
 b) the routing function selects a terminating trunk group;
 c) a trunk member is seized (for example, trunk ember with a CIC=100).

Step 2

An IAM is built and transmitted on the signaling link belonging to a routeset associated with DPC=2.

Step 3

The signaling link associated with DPC=2 is connected to the SPM associated with the originating switch. The SPM receives the SS7 IAM, extracts the ISUP information and packs it into ATM cells which it then transfers to the SSC through the ATM network. The SSC receives the IAM, but does not process it beyond message discrimination. The receipt of the IAM triggers the SSC to perform the following actions:
 a) using the OPC and DPC as indexes, look up the ATM end system address (AESA) for the originating and terminating switches (use of the CIC is also required if a switch is connected to more than one SPM);
 b) a check is made to see if an ATM virtual path SVC already exists between the originating and terminating SPM;
 c) the virtual circuit channel identifier (VCCI) is set to be the same as the trunk CIC;
 d) using either delegate signaling or Q.2931 proxy signaling, a connection is set up between the two end point addresses (AESA-original, AESA-terminating) if a cached SVC does not exist.

Step 4

A message is sent to the respective SPMs associated with the originating and terminating switches instructing them to perform an association of the trunk with the virtual path for the call. This transaction must be acknowledged (not shown) by both SPMs before proceeding.

Step 5

The IAM is transferred without modification to the SPM associated with the terminating switch.

Step 6

Call processing at this point continues without knowledge of the intervening ATM system.

Step 7

When the terminating switch has determined that the called party phone is idle, an ACM containing OPC=2, DPC=1, and CIC=100 is built at the terminating switch and forwarded using an appropriate routeset to the SPM associated with the terminating switch. The ACM is transferred to the SSC as described above and transferred to the SPM associated with the originating switch. Connection behaviour internal to the originating and terminating switches is performed normally without awareness of any ATM connection segment in the call.

Step 8

When the called party answers, an ANM is built using the codes OPC=2, DPC=1, and CIC=100 which is transmitted back to the originating node as described above.

Step 9

At this point, the call is connected and conversation may take place.

Step 10

In this example, the call is released when the calling party goes on hook (hangs up).

Step 11

The trunk member is idled, which triggers the SPM to release the cross-connect to the SVC that was connected to that trunk member.

Step 12

An REL message is formulated and sent to the SPM associated with the originating switch. The SPM transfers the message contents to the SSC.

Step 13

The release message is forwarded without modification to the SPM associated with the terminating switch. At this point, the SSC determines whether to maintain the virtual path or release it. In this example, the SSC determines that the SVC should be cached and the SVC is therefore not released.

Step 14
Normal release procedures are followed at the terminating switch.

Step 15
Idling the trunk on the terminating SPM triggers the SPM to release the cross-connect between the Step 16
The release procedure is completed by returning an RLC to the originating node from the terminating node, as described above for the REL message.

Although the ISUP messaging described with reference to FIG. 7 was done through the transit trunk subnetwork, it will be understood by those skilled in the art that, as described above with reference to FIG. 6, the SSC 60 could be connected directly to the common channel signaling network.

The present invention described herein is a transit trunk subnetwork which can significantly increase the traffic capacity and traffic movement efficiency between existing narrowband switching systems. It is to be observed, however, that the present invention is not limited to the structures and features explicitly shown in the drawings, and may be modified for particular environments as would be understood by a person of ordinary skill in the art. The invention is therefore intended to be limited only by the scope of the appended claims.

We claim:

1. A transit trunk subnetwork for interconnecting a first synchronous transfer mode switching system to a plurality of other synchronous transfer mode switching systems, the transit trunk subnetwork comprising:
   an asynchronous transfer mode (ATM) network connected by a first communications trunk to said first synchronous transfer mode (STM) switching system and by second communications trunks to said other STM switching systems;
   interfaces respectively connecting said first and second trunks with said ATM network, said interfaces converting bearer traffic from STM format to ATM format, and further converting bearer traffic from ATM format to STM format; and
   a signal controller for interpreting signaling messages and for mapping the movement of signaling messages between said first STM switching system and said other STM switching systems, said signal controller being adapted to identify ATM addresses of said interfaces associated with said first STM switching system and said other STM switching systems.

2. The transit trunk subnetwork as claimed in claim 1 wherein said signal controller controls the establishment of virtual circuits within said ATM network.

3. The transit trunk subnetwork system as claimed in claim 2 wherein said signal controller controls the mapping of virtual circuits between said first and second trunks and said interfaces.

4. A transit trunk subnetwork as claimed in claim 1 wherein the STM switching system is an access tandem.

5. A transit trunk subnetwork as claimed in claim 1 wherein the STM switching system is an end office.

6. A transit trunk subnetwork for enhancing bearer traffic capacity of an existing network which includes a plurality of local exchange carriers and a plurality of access tandems, the transit trunk subnetwork comprising:
   an asynchronous transfer mode (ATM) network;
   interfaces connected between said plurality of local exchange carriers and said ATM network, said interfaces being further connected to said access tandems;
   a signal controller for interpreting signaling messages and for mapping the movement of signaling messages between said exchange carriers and said access tandems, the signal controller being further adapted to identify ATM addresses of said interfaces; and
   a management system for managing bandwidth demand of said ATM network;
   wherein said signal controller and management system are independent of said exchange carriers, said access tandems, and ATM switches in said ATM network.

7. The transit trunk subnetwork as claimed in claim 6 wherein said ATM network comprises a plurality of interconnected ATM switches.

8. The transit trunk subnetwork as claimed in claim 6 wherein said interfaces terminate virtual channel connections within said ATM network.

9. The transit trunk subnetwork as claimed in claim 7 wherein said signal controller controls the establishment of virtual channel connections between ATM switches of said ATM network.

10. The transit trunk subnetwork as claimed in claim 6 wherein said interfaces comprise stand-alone interface platforms connected to each of said exchange carriers, so as to transfer bearer traffic from said local exchange carriers to said ATM network.

11. The transit trunk subnetwork as claimed in claim 10 wherein said stand-alone interface platforms are interconnected by the ATM network such that said stand-alone interface platforms can direct bearer traffic from one local exchange carrier through said ATM network to another interface connected to another local exchange carrier.

12. The transit trunk subnetwork as claimed in claim 6 wherein one of said access tandems interprets a signaling message related to a call setup and either directs the call to said ATM network or to an interexchange carrier, based on said signaling message.

13. The transit trunk subnetwork as claimed in claim 6 wherein one of said end offices translates a called number and either diverts a call associated with the called number to said ATM network, or to one of the access tandems.

14. A network comprising:
   at least two asynchronous transfer mode (ATM) switching systems respectively connected by a first communications trunk to a first synchronous transfer mode (StM) switching system and by second communications trunks to other STM switching systems;
   interfaces respectively connecting said first and second communications trunks with said respective ATM switching systems;
   a signal controller for each of said ATM switching systems, the signal controllers interpreting signaling messages and mapping the movement of signaling messages between said first communications trunk and said second communications trunks;
   a management system for each of said ATM switching systems, the management system managing bandwidth demand at said interfaces with said respective ATM switching systems;
   wherein said ATM switching systems are interconnected.

15. The network as claimed in claim 14 wherein movement of signaling messages between said ATM switching system is controlled by said signal controllers.

16. The network as claimed in claim 14 wherein movement of signaling messages within a given ATM switching system is controlled by said respective signaling controllers.

17. The network as claimed in claim 14 wherein said signal controllers and management systems are independent of said STM switching systems.

18. An asynchronous transfer mode (ATM) network that functions as a virtual tandem switch for interconnecting end offices of local exchange carriers, comprising:
- interfaces for converting synchronous transfer mode (STM) bearer traffic to ATM format and vice versa, the interfaces respectively connecting said end offices with said ATM network;
- a signal controller for interpreting signaling messages and for mapping the movement of signaling messages between said end offices and further adapted to identify ATM addresses of said interfaces; and
- a management system for managing bandwidth demand at said end offices.

19. The ATM network as claimed in claim 18 wherein said interfaces provide a direct connection between said end offices and said ATM network.

20. A method for expanding the communications capacity of a pre-existing network, said pre-existing network including synchronous transfer mode (STM) switching systems interconnected by trunk connections, said method comprising steps of:
- i) overlaying said STM switching systems with an asynchronous transfer mode (ATM) subnetwork;
- ii) interconnecting said ATM subnetwork and said STM switching systems using interfaces configured to convert: (1) incoming bearer traffic directed to said subnetwork from a synchronous transfer mode to asynchronous transfer mode, and; (2) outgoing bearer traffic directed away from said subnetwork from asynchronous transfer mode to synchronous transfer mode;
- iii) interconnecting a signal controller with said ATM subnetwork, said signal controller being adapted to interpret signaling messages and map the movement of signaling messages between said STM switching systems and said subnetwork, and further adapted to identify ATM addresses of said interfaces interconnecting said ATM subnetwork and said STM switching systems; and
- iv) interconnecting a management system to said ATM subnetwork to manage bandwidth requirements in said subnetwork.

21. The method as claimed in claim 20 wherein said STM switching systems are access tandems.

22. The method as claimed in claim 20 wherein said STM switching systems are local exchange carrier end offices.

23. The method as claimed in claim 20 wherein said method further includes a step of utilizing said signal controller to direct signaling messages received from a first STM switching system at a first interface across said ATM subnetwork to a second interface with said ATM subnetwork, and on to a second STM switching system.

24. The method as claimed in claim 20 wherein said ATM subnetwork comprises a plurality of interconnected ATM switches.

25. The method as claimed in claim 24, wherein said ATM subnetwork is connected to at least one other ATM subnetwork of interconnected ATM switches.

26. The method as claimed in claim 25 wherein said method further includes a step of utilizing said signal controller to direct signaling messages received from a first STM switching system at a first interface to a signal controller in the other ATM subnetwork of interconnected ATM switches which directs the message on to a second interface, and further on to a second STM switching system.

27. The method as claimed in claim 20 wherein said method further includes a step of utilizing said signal controller to establish permanent virtual circuits across said ATM subnetwork between said interfaces sand said signal controller.

28. A transit trunk subnetwork for enhancing signal traffic capacity of an existing telephone network in which a plurality of local exchange carriers communicate with a plurality of access tandems, the transit trunk subnetwork comprising:
- an asynchronous transfer mode (ATM) subnetwork;
- interfaces connected between said plurality of local exchange carriers and said ATM subnetwork, a one of said interfaces being connected to one of said access tandems;
- a signal controller for interpreting signaling messages and for mapping the movement of signaling messages between said exchange carriers and said access tandems, the signal controller being adapted to identify ATM addresses of said interfaces interconnecting said ATM subnetwork and said STM switching systems; and
- a management system for managing bandwidth demand of said ATM subnetwork at said interfaces;
  - wherein said signal controller directs signaling messages to said access tandems or passes the signaling message across said subnetwork to another local exchange carrier based on codes contained within said signaling messages.

29. The subnetwork system as claimed in claim 28 wherein said codes are indicative of a non-featured telephone call.

30. The subnetwork system as claimed in claim 28 wherein said codes are indicative of an end-featured telephone call.

31. The subnetwork system as claimed in claim 28 wherein said codes are indicative of a source-featured telephone call.

* * * * *